United States Patent [19]

Moore

[11] Patent Number: 5,556,634
[45] Date of Patent: Sep. 17, 1996

[54] PREPARATION OF NEAR-NEUTRAL ANIONIC SALT FEED MINERALS

[75] Inventor: William P. Moore, Hopewell, Va.

[73] Assignee: The Vigoro Corporation, Chicago, Ill.

[21] Appl. No.: 421,199

[22] Filed: Apr. 13, 1995

[51] Int. Cl.$^6$ ........................................... A61K 33/00
[52] U.S. Cl. ...................... 424/438; 424/439; 424/489; 424/499; 424/500
[58] Field of Search ...................... 424/489, 438, 424/439, 678, 681, 600, 602, 663; 514/951; 210/646, 647

[56] References Cited

U.S. PATENT DOCUMENTS 4,756,838  7/1988  Veltman ................................. 424/438

*Primary Examiner*—Thurman K. Page
*Assistant Examiner*—Sharon Howard

[57] ABSTRACT

A method of preparing a near-neutral homogeneous mineral composition containing an excess of strong anions over strong cations for supplementing ruminant animal feeds, wherein magnesium and calcium chlorides are admixed with a molecular excess of ammonium sulfate and water and heated until a liquid phase is formed in which a metathetical chemical reaction occurs to substantially form homogeneous particles of magnesium and calcium sulfates, ammonium chloride and excess ammonium sulfate. Addition of granule binders and conditioning clays allows preparation of minigranules from damp agglomerates formed during the reaction. The minigranules exhibit a high degree of strength, palatability and storage stability. The minigranular anionic salt composition prepared by the new method was found to be an effective mineral feed supplement for ruminant animals, particularly for preparturition cows.

17 Claims, No Drawings

PREPARATION OF NEAR-NEUTRAL ANIONIC SALT FEED MINERALS

BACKGROUND OF THE INVENTION

1. Field of the Invention

This invention relates to animal feed minerals and methods for their preparation in effective and economical forms. More particularly, it relates to a method of preparing a new composition of anionic salts by the metathetical reaction of magnesium and calcium chlorides with a molecular excess of ammonium sulfate to form a safe, palatable, homogeneous, particulate anionic salt composition, comprising magnesium and calcium sulfates, ammonium chloride, and ammonium sulfate. The invention also relates to the new composition formed which is effective as a supplement for feeding ruminant animals.

2. Description of Related Art

For optimum performance of commercial animals, the mineral composition of the feed rations which they receive must be formulated to correspond accurately to the nutritional needs. These needs are important with ruminant animals, and particularly critical and changeable with dairy cows. Dairy scientists have developed a term, Dietary Cation Anion Balance, which measures whether the mineral content of feed rations is positive or negative, positive indicating an excess of strong cations, and negative indicating an excess of strong anions.

The dairy cow's needs for predominantly cationic or anionic minerals varies widely depending upon the status of the animal. For example, cation rich minerals may need to be added to the diets of lactating cows. Cationic salts are used for this purpose. The most common ones are sodium bicarbonate, sodium carbonate, potassium bicarbonate, and potassium carbonate.

Until recently dry cow nutrition has been a neglected area of dairy cow nutrition. It has been reported that this approximately 60 day feeding period is very important and sets the stage for subsequent lactation performance.

Recent work by dairy scientists has shown a positive response in cows to feeding anionic salts in an acidogenic diet in the 3–6 week dry period prior to calving, with the benefits defined as decreased incidence of milk fever and hypocalcemia, increased milk production, and improved reproductive performance. The surplus of strong anions over strong cations results in a series of physiological events, which might be described as the anionic effect. Some of these events are listed as follows: increased calcium absorption in the intestines, mobilization of calcium in the bones to help neutralize the strong anions fed, and reduced blood pH.

Compounds found to effectively and economically supply strong anions for mineral feed supplements are compositions combining magnesium sulfate, calcium sulfate, ammonium sulfate and ammonium chloride. In the present practice of dairy feed supplementation, two or more of these salts are physically blended to form an anionic salt mixture for addition to cattle feed rations, or for storage. Although these physical mixtures, when adequately blended, are nutritionally effective, they exhibit poor handling, storage and use properties. The fact that they are not homogeneous causes problems of poor palatability and the hazard of inaccurate formulation.

The economics of using the physical mixtures are adversely affected by the necessity of purchasing and mixing the individual salts, particularly the costly ammonium chloride and magnesium sulfate. Both compounds are deliquescent. Depending upon the salts used and the effectiveness of their blending, some of the blend may be quite acid or ammoniacal, and unpalatable to the consuming animals. When some of the salts, such as ammonium chloride, are separated as powders, lumps, or solutions, the mixture becomes unpalatable to ruminant animals.

To fulfil practical utilization of the improved procedure of the dairy scientists, a method has been needed for producing a new anionic salt composition which is physiologically effective, palatable, storage stable, and readily handleable in commercially available equipment.

Anionic salts as described herein are salt mixtures wherein the combined strong anions outnumber the combined strong cations. Such salts react in acid manners and would normally exhibit pH's less than 7. Highly acidic salts may be unsafe and unpalatable as feed supplements so that effective anionic salt mixtures with near neutral pHs are highly desirable.

Strong ions are those ions which exert the strongest effects on acid-base balances. The important strong ions used in feed minerals comprise the cations sodium and potassium and the anions chloride and sulfate. An anionic salt mixture must contain more strong anions than strong cations. Although important to animal nutrition and buffering, weaker cations such as calcium, magnesium and ammonium, and weaker anions such as carbonate and bicarbonate, have little effect on the strong anions in the anionic salt mixture.

Magnesium and calcium chlorides are economically available sources of the important nutrients magnesium and calcium and the strong anion chloride. Ammonium sulfate, while not normally found in nature, is widely available as an economical by-product from chemical processes for nylon-6, and steel manufacturing, and provides the strong anion sulfate and the ruminant nutrient nitrogen.

The term "molecular excess of ammonium sulfate" is used herein to mean more than enough to react completely with all of the molecules of magnesium and calcium chloride.

OBJECTS OF THE INVENTION

It is a primary object of this invention to provide an effective method of preparing a palatable, near-neutral, homogeneous anionic salt animal feed mineral composition exhibiting use safety, storage stability, and superior conditioning.

It is another primary object to provide a method of preparing anionic salt animal feed mineral compositions by coreacting economically available calcium and magnesium chlorides and ammonium sulfate.

It is still another primary object to provide an improved, palatable, near-neutral, user safe, storage stable anionic salt feed mineral composition for ruminant animals.

BRIEF SUMMARY OF THE INVENTION

I have discovered an improved method of preparing a particulate, homogeneous feed mineral composition for ruminant animals, which contains an excess of strong anions over strong cations sufficient to make it an effective anionic salt even though the pH of the composition is near-neutral.

In the instant method, one or more, of magnesium and calcium chlorides are thoroughly mixed with a molecular excess of ammonium sulfate and water, and heated until sufficient magnesium and calcium chlorides and ammonium sulfate are dissolved to allow a liquid phase metathetical chemical dissolved to allow a liquid phase metathetical chemical reaction to start. Heating and mixing is continued until magnesium and calcium sulfates, and ammonium chloride are formed by the metathetical reaction and combined with the molecular excess of ammonium sulfate into homogeneous particles, which are then dried to between 1 and 20 percent moisture content.

It was further discovered that the near-neutral, particulate, homogeneous composition, prepared by the new metathetical reaction method, containing an excess of strong anions over the strong cations, is a particularly safe, effective, and palatable feed mineral supplement for ruminant animals.

DETAILED DESCRIPTION OF THE INVENTION

The method of the instant invention allows preparation of a near-neutral, particulate, homogeneous feed mineral composition which contains an excess of strong anions over strong cations sufficient to make an effective anionic salt for supplementing ruminant animal feeds.

For successful operation of the method one, or more, of the chlorides of magnesium and calcium are admixed with a molecular excess of ammonium sulfate and water. The admixture must be heated until sufficient metal chloride and ammonium sulfate dissolve to initiate a liquid phase metathetical chemical reaction between the ingredients.

Heating and mixing are continued until the liquid phase metathetical reaction has formed magnesium and calcium sulfates, and ammonium chloride. These products are homogeneously combined with the molecular excess of ammonium sulfate and water contained in the reaction mixture to form damp particles. The particles are then dried to a moisture content of between 1 and 20 percent to make them storage stable.

It was found that some hydrogen chloride is lost from the particles when they are dried to moisture contents lower than 1 percent. Moistures higher than 20 percent cause the particles to be corrosive to metals and not storage stable.

Ammonium sulfate, in addition to being a reactant in the metathetical reaction of the instant method, is a necessary ingredient of the anionic salt supplement composition.

It is therefore necessary that a molecular excess of ammonium sulfate be reacted with the magnesium and calcium chlorides, so that substantial amounts of ammonium sulfate remain unreacted in the particulate reaction product. It was found that a molecular ratio of ammonium sulfate to magnesium plus calcium chlorides between 1.1 to 1.0 and 2.2 to 1.0 is necessary to allow completion of the metathetical reaction and provide an effective anionic salt ruminant feed supplement composition.

Although the metathetical reaction will take place at ambient temperature, it is effectively done at temperatures between 50° and 110° C. where the solubilities of the salts are high enough to allow the required liquid phase reaction to take place without a high concentration of water present, which makes the recovery of damp particles difficult. Temperatures higher than 110° C. cause the formation of corrosive hydrogen chloride and loss of necessary chloride from the anionic salt particles.

The heating and mixing must be continued in the instant method for a period of time between 5 and 60 minutes to allow the magnesium and calcium chlorides to react metathetically with the ammonium sulfate to form metal sulfates and ammonium chloride, combined with the excess unreacted ammonium sulfate in homogeneous damp particles.

The method is effectively completed by drying the homogeneous damp particles to a moisture content between 1 and 9 percent at a temperature between 60° and 105° C. The particles, low in moisture, physically handle better than damp particles, but chloride losses limit the degree of drying obtainable in a practical manner. Drying is slow below 60° C. and chloride losses become a problem at drying temperatures higher than 105° C.

It was discovered that the near-neutral, homogeneous feed mineral composition, comprising ammonium chloride, magnesium and calcium sulfates and ammonium sulfate in about equal molecular amounts, provides the strong anions for effective supplementation of ruminant animal feeds when prepared by the instant method. The new composition effectively delivers the required mixture of excess strong anions and weak cations and does so in a near-neutral, safe manner. The composition contains no areas of unmixed, highly concentrated, unpalatable, and perhaps toxic, salts, allowing the mixture to be safely fed.

It was found that a palatable anionic salt composition for animal feed supplementation which showed improved use efficacy and storage stability could be prepared in the form of minigranules in a preferred form of the instant invention.

In this preferred form of the method magnesium and calcium chlorides are admixed with a molecular excess of ammonium sulfate and water amounting to between 23 and 40 percent of the mixture, and heated to a temperature between 50° and 100° C., until sufficient magnesium and calcium chlorides and ammonium sulfate dissolve to permit a liquid phase metathetical chemical coreaction of the magnesium and calcium chlorides and ammonium sulfate.

It is necessary to continue heating and mixing until the metathetical reaction has been substantially completed to form magnesium and calcium sulfates and ammonium chloride homogeneously mixed with the unreacted molecular excess of ammonium sulfate and water in damp agglomerates.

The method is improved by admixing conditioning clay in amounts sufficient to convert the damp agglomerates to minigranules, and also admixing a granule binder in amounts sufficient to provide increased strength to the minigranules formed.

It is still necessary to dry the anionic salt minigranules to a moisture content between 1 and 15 percent, although the conditioning clay allows the use of somewhat higher moisture.

In the preferred method, magnesium and calcium chlorides and mixtures thereof may be used effectively. The most effective operation of the method is found when calcium chloride amounts to between 0 and 25 percent and magnesium chloride amounts to between 75 and 100 percent of the total metal chlorides used.

The water of crystallization in the magnesium and/or calcium chloride compounds usually provides sufficient moisture to dissolve the chlorides under the reaction conditions of the method. Bischofite, the usual commercial form of magnesium chloride, contains six molecules of water of crystallization per molecule of magnesium chloride and provides sufficient moisture for the necessary liquid phase reaction.

In the preferred method, heating and mixing is continued for a period of time between 5 and 30 minutes until the metathetical reaction and formation of the minigranules are completed.

Several clays may be used to effectively condition the minigranules formed in the method of this invention. Clays performing most effectively in the method are diatomaceous earth, Bentonite, Attapulgite, talc, and Fuller's Earth. The use of between 5 and 15 percent of these conditioning clays converts the damp reaction mixture to free flowing minigranules.

A variety of granule binders may be used in the instant method to strengthen minigranular anionic salt compositions. The most effective granule binders are cane molasses, wood molasses, lignin sulfonate, lignin, iron humate, and ureaformaldehyde resin. The molasses serves a dual function of enhancing minigranule strength and the palatability of the anionic salts.

The term minigranules is used herein to mean smaller than regular fertilizer granules. The minigranules are usually semi-spheroid in shape and in the −20 to +40 U.S. Standard Mesh size range.

After the minigranules are produced with the granule binders and conditioners, it is still necessary to dry at a temperature between 70° and 110° C. to reach a moisture content between 7 and 11 percent to obtain the optimum anionic salt product strength and conditioning.

Palatability of the anionic salt may be compromised if free ammonia is present. To assure that free ammonia does not occur in the homogeneous minigranular composition prepared by the present method, between 0.1 and 0.5 percent sulfuric acid may be added to the metathetical reaction mixture to provide a pH of between 6 and 7 in the dried minigranule composition.

By use of the preferred method, a minigranular palatable, near-neutral, anionic salt composition for animal feed supplementation is prepared which exhibits improved efficacy as shown by improved animal performance, and improved storage stability. The preferred composition contains between 15 and 30 percent ammonium chloride, between 15 and 34 percent ammonium sulfate, between 16 and 30 percent magnesium sulfate, and between 0 and 25 percent calcium sulfate.

In the most practical aspect of the instant method. A minigranular, palatable, economical, anionic salt composition is prepared for feeding dry cows as a mineral supplement, exhibiting a strong excess of anions over strong cations of more than 15 milliequivalents per 1000 grams. To prepare this To prepare this most practical composition, between 25 and 50 parts magnesium chloride hexahydrate, between 10 and 20 parts calcium chloride containing between 5 and 25 percent moisture, between 50 and 60 parts ammonium sulfate, and between 0 and 1 part sulfuric acid are admixed thoroughly. The mixture is heated to a temperature between 60° and 110° C. until the magnesium and calcium chlorides melt and dissolve sufficient ammonium sulfate to permit a liquid phase metathetic reaction of the magnesium and calcium chlorides with ammonium sulfate.

The reaction must be completed by continuing heating and mixing until the metathetical reaction has been substantially completed to form magnesium and calcium sulfates, and ammonium chloride, homogeneously mixed with the unreacted excess of ammonium sulfate, and sulfuric acid in damp agglomerates.

While the agglomerates are still damp and pliable, between 5 and 10 parts of diatomaceous earth and between 2 and 5 parts cane molasses are admixed therewith to form strong, damp dry minigranules. The damp dry granules still contain a considerable amount of moisture, but because of conditioning, they may be handled in bulk without difficulty.

Although the damp dry minigranules may be handled, it is preferred to dry the minigranules to a moisture content of between 5 and 12 percent to provide for good storage stability and minigranule strength.

All parts and percents used in this disclosure are by weight unless otherwise specified.

MODE OF OPERATION OF THE INVENTION

Having described the basic concepts of the instant invention, reference is now made to the following examples which are provided to illustrate the new method of preparing anionic salt feed mineral, and to illustrate the improved efficacy of the mineral feed supplement for ruminant animals prepared by the new method.

EXAMPLE 1

This example demonstrates the practical and preferred method of preparing a minigranular, near-neutral, palatable, storage stable, anionic salt composition for animal feed supplementation.

To an Eirich Model R-08 intensive mixer was added dry ingredients, as follows:

| Materials | Wt, lbs |
| --- | --- |
| Bishofite, 11.3 Mg, 37.0 Cl, 0.2 Ca, 53.2 $H_2O$ | 29.5 |
| Ammonium Sulfate, 21 N–25 S | 53.7 |
| Calcium Chloride, 90 $CaCl_2$, 5 $H_2O$ | 16.4 |

The mixture was heated to 65° C. while vigorously mixing by operating the 12 in. diameter rotor in the Eirich Machine at 533 rpm and the 36 in. diameter pan at 46 rpm. As the mixing and heating occurred, the liquid phase reaction of magnesium and calcium chloride with the ammonium sulfate was initiated, increasing temperature in the reaction mixture to 88° C.

The high shear mixing was continued at the elevated temperature until the calcium and magnesium sulfates, and ammonium chloride were combined with the unreacted excess ammonium sulfate as damp agglomerates in 20 minutes elapsed time.

With the agitation rotor and pan still operating in the Eirich intensive mixer, 5 pounds of diatomaceous earth powder and 3.80 pounds of sugar cane molasses containing 70 percent dry matter were then added. The mixing-rolling action of the Eirich Machine was continued another 5 minutes and the damp agglomerates were converted to minigranules.

The minigranules were removed batchwise and dried in a continuous fluid bed dryer until moisture content of the minigranules was 13.7 percent. The granules exhibited an average crush strength of 4.3 pounds, a pH (as a 10% aqueous mixture) of 6.7, and were free flowing and homogeneous.

Chemical analyses showed the composition of the minigranules to be as follows:

| Components | Wt % |
| --- | --- |
| Ammonium Chloride | 28.25 |
| Ammonium Sulfate | 15.13 |
| Magnesium Sulfate | 16.91 |

| Components | Wt % |
| --- | --- |
| Calcium Sulfate | 13.60 |
| Molasses Solids | 1.60 |
| Diatomaceous Earth | 7.20 |
| Moisture | 13.75 |
| Other (by diff.) | 3.56 |
| Total | 100.00 |

EXAMPLE 2

This example demonstrates the efficacy of the new anionic salt as mineral feed supplement for dry cows.

Tests were made by feeding 20 Holstein cows with two or more previous lactations but which were now dry. The feeding period for each cow started 21 days before the cows expected parturition date and ended at parturition. After parturition, the cows were managed and fed normally.

One group of 10 cows received a nonanionic feed ration and the other group of 10 received an anionic feed using the composition produced in Example 1. In the test, the anion-cation balance was measured as the milliequivalents of sodium plus potassium minus the chlorine plus sulfate ions. With all aspects of the feed rations the same except the anion-cation balance, the results of the comparative tests are tabulated as follows:

| Type Ratio | Nonanionic | Anionic |
| --- | --- | --- |
| Individuals in Test Group | 10 | 10 |
| A–C Balance, meq. (Na + K) – (Cl + S) /Kg | +185 | –75 |
| Ca concentration in blood, Mg/ml on day of calving | 0.35 | 0.41 |
| Parturient Paresis, individuals showing clinical signs of weakness or recumbrancy related to parturition. | 2 | 0 |
| Fetal membranes retained longer than 12 hours. | 1 | 0 |

The use of the anionic salt mineral feed composition of Example 1 was an effective ruminant animal feed supplement.

I claim:

1. A method of preparing a near-neutral, particulate, homogeneous, mineral composition, which contains an excess of strong anions over strong cations, for supplementing ruminant animal feeds, the method comprising:
   (a) admixing magnesium and calcium chlorides with a molecular excess of ammonium sulfate, and an amount of water sufficient to create a liquid phase;
   (b) heating the admixture until sufficient magnesium and calcium chlorides and ammonium sulfate dissolve to initiate a liquid phase metathetical chemical reaction;
   (c) continuing heating and mixing until the liquid phase metathetical reaction has formed damp particles of magnesium sulfate and calcium sulfate and ammonium chloride homogeneously combined with the molecular excess of ammonium sulfate; and
   (d) drying the damp particles until free moisture content is between 1 and 20 percent.

2. The method of claim 1 wherein the molecular excess of ammonium sulfate amounts to a molecular ratio of ammonium sulfate to magnesium and calcium chlorides between 1.1 to 1.0 and 2.2 to 1.0.

3. The method of claim 1 wherein the mixture is heated to a temperature between 50° and 110° C.

4. The method of claim 1 wherein the heating and mixing is continued for a period of time between 5 and 60 minutes, until the magnesium and calcium chlorides have reacted metathetically with the ammonium sulfate to form magnesium and calcium sulfate and ammonium chloride combined with the excess ammonium sulfate in homogeneous damp particles.

5. The method of claim 1 wherein the homogeneous damp particles are dried to a moisture content of between 1 and 9 percent at a temperature between 60° and 105° C.

6. The near-neutral, homogeneous feed mineral composition comprising magnesium and calcium sulfates, ammonium chloride and ammonium sulfate in about equal molecular amounts, which provides strong anions in excess of strong cations for supplementation of ruminant animal feeds, prepared by the method of claim 1.

7. A method of preparing a minigranular, palatable, anionic salt composition for animal feed supplementation, exhibiting improved efficacy, and storage stability, the method comprising:
   (a) admixing magnesium and calcium chlorides with a molecular excess of ammonium sulfate and between 23 and 40 percent water;
   (b) heating the admixture to a temperature of between 50° and 100° C. until sufficient magnesium and calcium chloride and ammonium sulfate dissolve to permit a liquid phase metathetical chemical coreaction of the magnesium and calcium chlorides and ammonium sulfate;
   (c) continuing heating and mixing until the metathetical reaction has been substantially completed to form magnesium and calcium sulfates, and ammonium chloride, homogeneously mixed with the unreacted molecular excess of ammonium sulfate, in damp agglomerates;
   (d) admixing conditioning clay in amounts sufficient to convert the damp agglomerates to minigranules, and a granule binder in amounts sufficient to provide increased strength to the minigranules formed; and
   (e) drying the minigranules to a moisture content of between 1 and 15 percent.

8. The method of claim 7 wherein the chloride comprises between 0 and 25 percent calcium chloride and 75 to 100 percent magnesium chloride.

9. The method of claim 7 wherein water of crystallization present in the magnesium and calcium chlorides is sufficient to dissolve the magnesium and calcium chlorides under reaction conditions of the method.

10. The method of claim 7 wherein the heating and mixing is continued for a period of time between 5 and 30 minutes until the metathetical reaction and formation of minigranules are completed.

11. The method of claim 7 wherein the conditioning clay is selected from the group consisting of diatomaceous earth, Bentonite, Attapulgite, talc, and Fullers Earth.

12. The method of claim 7 wherein conditioning clay amounts to between 5 and 15 percent of the dried minigranules.

13. The method of claim 7 wherein the granule binder is selected from the group consisting of sugar cane molasses, wood molasses, lignin sulfonate, lignin, iron humates and ureaformaldehyde resin.

14. The method of claim 7 wherein the minigranules are dried at a temperature between 70° and 110° C. until moisture content is between 7 and 11 percent.

15. The method of claim 7 wherein sulfuric acid is added in amounts between 0.1 and 0.5 percent of the metathetical reaction mixture to provide a pH of between 6 and 7 in the dried minigranules.

16. The minigranular, palatable, near-neutral anionic salt composition for animal feed supplementation exhibiting improved efficacy and storage stability, prepared by the method of claim 7, and comprising between 15 and 30 percent ammonium chloride, between 15 and 34 percent ammonium sulfate, between 16 and 30 percent magnesium sulfate, and between 0 and 25 percent calcium sulfate.

17. A method of preparing a minigranular, palatable, anionic salt composition for feeding as mineral supplements for dry cows, exhibiting an excess of strong anions over strong cations in excess of more than 15 milliequivalents per 1000 grams of salt composition, the method comprising:

(a) admixing between 25 and 50 parts magnesium chloride hexahydrate, between 0 and 20 parts calcium chloride containing between 5 and 25 percent moisture, between 50 and 60 parts ammonium sulfate and between 0 and 1 part sulfuric acid;

(b) heating the admixture to a temperature of between 60° and 110° C. until the magnesium and calcium chlorides melt and dissolve sufficient ammonium sulfate to permit a liquid phase metathetical reaction of the magnesium and calcium chlorides with ammonium sulfate;

(c) continuing heating and admixing until the metathetical reaction has been substantially completed to form magnesium and calcium sulfates, ammonium chloride, homogeneously mixed with the unreacted excess of ammonium sulfate and sulfuric acid in damp agglomerates;

(d) admixing therewith between 5 and 10 parts diatomaceous earth and between 2 and 5 parts cane molasses to form strong damp dry minigranules; and, (e) drying to a moisture content of between 5 and 12 percent.

* * * * *